United States Patent
Edson

(10) Patent No.: US 6,526,581 B1
(45) Date of Patent: Feb. 25, 2003

(54) MULTI-SERVICE IN-HOME NETWORK WITH AN OPEN INTERFACE

(75) Inventor: Richard Edson, Lakefront, IL (US)

(73) Assignee: Ucentric Holdings, LLC, Chicago, IL (US)

( * ) Notice: Subject to any disclaimer, the term of this patent is extended or adjusted under 35 U.S.C. 154(b) by 0 days.

(21) Appl. No.: 09/365,726

(22) Filed: Aug. 3, 1999

(51) Int. Cl.[7] .......................... H04N 7/18; H04N 7/173; H04N 7/00

(52) U.S. Cl. ............................ 725/74; 725/74; 725/80; 725/111; 348/552

(58) Field of Search ........................... 348/552; 725/74, 725/78, 80, 85, 131, 140–141, 150, 108–110, 111, 133, 153

(56) References Cited

U.S. PATENT DOCUMENTS

| | | | |
|---|---|---|---|
| 5,010,399 A | | 4/1991 | Goodman et al. |
| 5,130,793 A | | 7/1992 | Bordry et al. |
| 5,321,846 A | * | 6/1994 | Yokota et al. ................ 455/4.2 |
| 5,630,204 A | * | 5/1997 | Hylton et al. ................ 455/3.3 |
| 5,708,961 A | * | 1/1998 | Hylton et al. ................ 455/4.2 |
| 5,756,280 A | * | 5/1998 | Soora et al. .................. 455/4.2 |
| 5,774,527 A | * | 6/1998 | Handelman et al. ..... 379/93.07 |
| 5,781,892 A | | 7/1998 | Hunt |
| 5,790,548 A | | 8/1998 | Sistanizadeh et al. |
| 5,847,751 A | | 12/1998 | Safadi |
| 5,880,864 A | | 3/1999 | Williams et al. |
| 5,886,732 A | * | 3/1999 | Humpleman .................. 348/10 |
| 5,886,752 A | | 3/1999 | Humpleman |
| 5,892,758 A | * | 4/1999 | Arygroudis .................. 370/335 |
| 6,219,042 B1 | * | 4/2001 | Anderson et al. ............ 345/327 |
| 6,219,409 B1 | * | 4/2001 | Smith et al. ........... 379/106.09 |
| 6,230,194 B1 | * | 5/2001 | Frailong et al. ............. 709/220 |
| 6,272,212 B1 | * | 8/2001 | Wulforst et al. ............. 379/199 |
| 6,308,213 B1 | * | 10/2001 | Valencia ..................... 709/229 |
| 6,317,742 B1 | * | 11/2001 | Nagaratnam et al. .......... 707/9 |
| 6,317,884 B1 | * | 11/2001 | Eames et al. .................. 725/78 |
| 6,385,653 B1 | * | 5/2002 | Sitaraman et al. .......... 709/230 |
| 6,388,399 B1 | * | 5/2002 | Eckel et al. ................. 315/312 |
| 6,452,923 B1 | * | 9/2002 | Gerzberg et al. ........... 370/352 |

OTHER PUBLICATIONS

Olshansky et all., Residential LAN Architecture IEEE.*
Olshansky et al., Residential LAN Archecture (IEEE).
Rusnak, Anywhere In The House (IEEE, 1997).
Cisco, Layer Two Forwarding (Protocol) "L2F" (May, 1998).

(List continued on next page.)

Primary Examiner—Andrew Faile
Assistant Examiner—Son P. Huynh
(74) Attorney, Agent, or Firm—McDermott, Will & Emery

(57) ABSTRACT

The present invention utilizes a gateway providing an open software interface to control in-home communications and to enable in-home devices of various divergent technologies to selectively access external communication features. An in-home communication network utilizes any one or more of several available in-home digital networking media to connect the gateway to device interfaces. The gateway comprises interfaces to a plurality of external communication networks, and one or more in-home communication media, a router coupled to the various interfaces and a controller. Each device specific accessing the in-home network connects to media through a device interface. There will be different interfaces for enabling access by different types of customer premises devices. Each device interface provides physical access to the media as well as functional interfacing, to enable operation with the particular type of customer premises device. All of the device specific interfaces implement a standard software referred to as a common application program interface (API) interface, to enable communication over the media and accessing of in-home and/or external communication services through the gateway.

25 Claims, 3 Drawing Sheets

OTHER PUBLICATIONS

"Product Overview", by Tut Systems, 1998 Tut Systems Inc.

"Market Applications", by Tut Systems, http://www.tustsys.com/body_market_app.html, 1998 Tut Systems, Inc., printed Mar. 31, 1999.

"FastCopper Information", by Tut Systems, http://www.tutsys.com/body_fast_copper.html, 1998 Tut Systems, Inc., printed Mar. 31, 1999.

Home PNA Information, by Tut Systems, http://www.tutsys.com/body_home_pna.html., 1998 Tut Systems, Inc., printed Mar. 31, 1999.

"Motorola in Develop Broadband Home Networking Gateways", http://www.mot.com/MIMS/Multimedia/pr_tmp/02_.

* cited by examiner

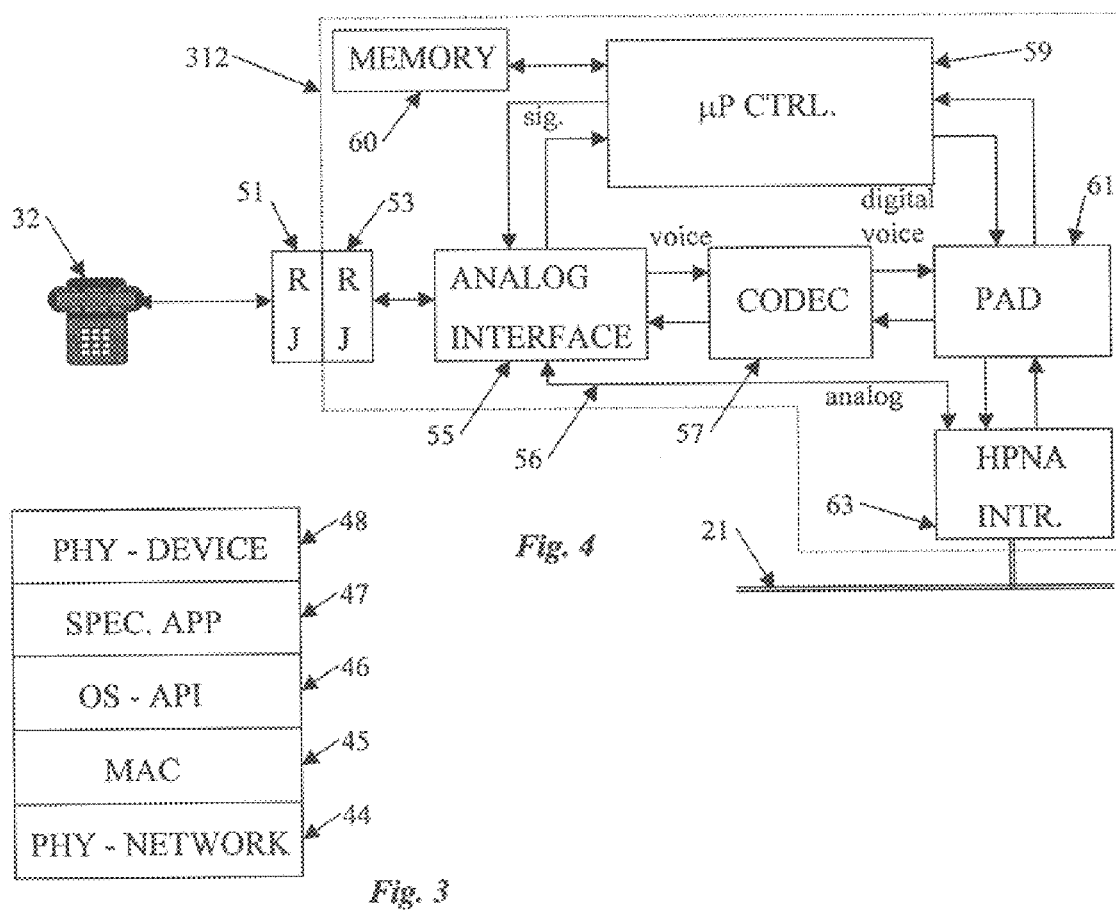

MULTI-SERVICE IN-HOME NETWORK WITH AN OPEN INTERFACE

FIELD OF THE INVENTION

The present invention relates to user-premises networking, to allow different types of systems and/or communications devices to utilize one in-home network to communicate with each other and to access a range of outside communication services.

BACKGROUND

Today, the typical home has a wide variety of electrical and electronic devices performing many diverse and unrelated functions. To the extent if any that these devices are interconnected or connect to the outside world, the connections at most form isolated islands of connection or communication.

For example, if the homeowner has a television and a video cassette recorder, these elements connect to each other, to the AC power grid and to a source of analog video signals, such as an antenna or a cable television link. The television set may also connect to an output from a video game. Typically, these connections are analog.

The home-owner also will have an audio system, often comprising interconnected components such as an amplifier, a compact disk (CD) player and a tape recorder. A tuner connects to an antenna or other RF source, and the amplifier provides connections to one or more sets of speakers. In most installations, the audio system is connected together by various analog wiring separate from that used to interconnect the video system components.

There have been some proposals for interconnecting in-house video systems. For example, U.S. Pat. No. 5,010,399 to Goodman et al. discloses a system for transmitting signals between video components over residential telephone wiring, to enable one VCR to supply television signals to multiple television receivers in different rooms. Control signals also are sent over the telephone wiring to control the VCR. The Goodman system provides communications mainly for video components. U.S. Pat. No. 5,130,793 to Bordry et al. discloses a tapping technique for such a system, to enable baseband transmission of audio and video signals over twisted-pair wiring. These in-house video communication systems utilize analog communications and provide only limited communications capabilities. They also do not provide communications to the outside world.

U.S. Pat. No. 5,708,961 to Hylton et al. discloses a digital video system, providing wireless distribution of selected broadband programs from a public network to individual terminals and associated TVs within the premises. There is a suggestion that one of the video terminals might provide an interface to a personal computer (PC), to enable the PC to communicate via the digital network.

Today, telephone station sets or other telephone equipment separately connects to an analog or integrated services digital network (ISDN) telephone line. Typically, the telephone line does not interconnect to the video or audio equipment.

Most appliances in the home stand alone. For example, the heating and air-conditioning system, the hot water heater, the stove, the microwave, the refrigerator, etc. all have connections to power, but not to any type of central control. Some homes do have alarm systems, and some such systems will monitor some internal conditions or appliances, like the temperature maintained by the heating and air-conditioning system; but these systems only provide internal alert signals and/or communications to some outside agency, typically over the telephone line. Again, the system entails wiring that is separate from that used for other purposes, such as audio and video entertainment.

Many individuals now have their own personal computers (PCs), and today, the typical PC includes some type of modem for communication. Typically, the modem provides a data link through either the telephone line or the cable television network to enable access to the public Internet. Although there have been some proposals to interconnect the PC to alarm systems, appliances and/or video and audio components, such interconnections have not been particularly successful. Often, the interconnection has been rather limited, for example, to just allow the PC to control an appliance or in-home lighting or just to allow the PC to monitor the alarm system. In other proposals, the PC interconnection provides more comprehensive communications, but the interconnection has been overly complex and expensive. Interconnection to a television, for example, typically requires a set-top terminal or adapter with almost as much hardware as in the PC itself.

Also, with the increasing popularity of PCs, many people now find that they have more than one PC in their homes. Many of these individuals also are finding reasons to interconnect their PCs, to share certain resources such as a high-speed Internet access link or a printer or to exchange data for various purposes. A number of products have recently reached the market to allow in-home networking. However, these products have focused entirely on the PC-to-PC communications. Most of these products essentially provide a local area network (LAN) in the home, which is some form of scaled down network similar to those used in commercial enterprises. For example, Tut Systems offers a line of home networking product under the name HomeRun. A network constructed from the products provides a 10 Mb/s LAN over a single pair of twisted wires. However, the LAN provides data connections only for computers and related peripheral equipment. As such, there is no communication with many of the other systems and appliances in the home. Other systems, such as the audio and video systems, remain as separate analog only systems with no communication over the in-house LAN. Also, existing home data network products provide little or no outside access, except possibly through a shared computer resource such as a modem or the like within one of the PCs.

As shown by the above discussion, the existing in-home systems have remained isolated, either as individual units or small collections of interconnected units. There has not been a unified interconnection strategy. Also, access by each system to wide area communications, external to the premises, has been dedicated to one external network. The video system components receive television programming from a cable or antenna carrying channels of a set of predetermined frequencies. Audio system components similarly receive radio programming from an antenna carrying channels of another set of predetermined frequencies. Alarm systems communicate via ISDN or POTS type telephone lines and the public switched telephone network (PSTN). The PC may use a telephone line, ISDN, DSL or cable modem, but typically PC communications for one user access only one such external media.

A need therefore exists for a home network product that provides a simple common interface usable by a wide range of systems and appliances within the premises. Such a network should offer digital communication capabilities to the different devices coupled to the network. Also, the network should provide access to two or more communications media connected to public network facilities. Preferably, one or more of the outside network connections should provide broadband digital capabilities. It is desirable that the in-home network enables virtually all devices to selectively access any or all of the external communication resources.

DISCLOSURE OF THE INVENTION

To meet the above stated needs and objectives, an in-home digital network comprises a central node providing multiple connections to outside networks, preferably including at least one broadband network. The central node or "gateway" provides an open interface over the in-home network media, to enable various devices to communicate over the in-home network and to access external communication resources. The open-interface concept contemplates a physical interface to the in-home network and a software interface between the gateway and communication elements or interfaces associated with various devices on the in-home network. Adapters or interface cards supporting the physical and software interfaces can provide in-home network access for virtually any type of electronic device.

In one aspect, the inventions relate to in-home networks. Such a network includes a gateway having interfaces to a plurality of external communication networks, an interface to at least one in-home communication media and a gateway. The network also includes the in-home media, coupled to the appropriate interface in the gateway. Each device accessing the in-home network connects to the media through a device specific interface. There will be different interfaces for enabling access by different types of customer premises devices. Each device specific interface provides physical access to the media as well as a standard software interface, referred to as an application program interface (API) to enable communication over the media and access to in-home and/or external communication services through the gateway. Each device specific interface also provides appropriate signal conversions and functional interfacing, to enable operation with the particular type of customer premises device.

SUMMARY

Hence, each device specific interface includes a physical media interface for coupling to the internal network media and a common application program interface for controlling communication through the physical media interface. The processor of the gateway executes a software program to perform routing control in a manner that is compatible with the control of communication by the application program interface. All of the device specific interfaces utilize this common application program interface. The different types of device interfaces, that is to say for connection of different devices, have different physical interfaces for coupling to the actual devices. Each different device specific interface also has an application program, which is specific to the type of connected device, but is compatible with the common API.

In accord with another aspect or invention, a gateway provides communications internal to a premises and provides access to multiple external communication networks. The gateway includes an internal interface and two or more external network interfaces. The internal interface is for coupling to an internal communication media and is compatible with communications over that media. Each external network interface provides a digital communication connection for a different type of wide area network link. At least one of the external network interfaces provides a broadband digital communication connection. The gateway also includes a router, coupled between the internal interface and the external interfaces, for selectively routing digital information to and from the interfaces. A program controlled central processing unit within the gateway controls the operation of the router. The control enables digital communication between devices coupled to the internal media. The routing control also enables selective communications of the devices via the external network interfaces. A software program, executable by the central processing unit, is compatible with a common application program interface implemented by interfaces for providing the coupling of the devices to the internal communication media.

The preferred embodiment of the gateway also includes a firewall. The firewall is coupled for communication with the external network interfaces and is coupled to the router. The firewall provides security on communications via the wide area network links.

In the preferred embodiments, the internal and external interfaces take the form of plug-in cards. As such, it is relatively easy to add, remove or change cards as desired, to provide the interconnections currently appropriate for a particular customer's premises. By using available interfaces, it is possible to install the inventive gateway so as to provide selective connections to any desirable combination of two or more of: telephone lines (POTS, ISDN, DSL, T1, etc.), coaxial cable links for cable modem service or for more advanced digital broadband cable services, wireless digital communication networks, and/or local or wide area data networks outside the premises. Within the premises, the gateway may interface to telephone wiring, the in-home power line circuitry; an in-home wireless link, a customer premises local area network, or the like as well as combinations of two or more of these in-home media.

The in-home media and associated device specific interfaces enable connection of virtually any electrical or electronic device within the premises to the network. In this manner, telephones, computers and peripherals, appliances, alarm systems and video and audio entertainment systems all can communicate via a unified in-home network. Also, any or all of these in-home devices may communicate with external systems, via the interfaces to the public networks provided through the gateway.

Other aspects of invention relate to the program code software of the gateway and/or the device specific interfaces, as may be carried on or installed in one or more computer readable mediums. The program code is for use in a system for providing data communications within a premises and data communications access to wide area network links. The executable code includes two modules or programs, one for a central processing unit of the gateway the other for the device specific interfaces. The programming for the central processing unit controls the data communications within the premises and the data communications access to the wide area network links. The programming for the central processing unit implements these control functions in a manner compatible with a predetermined application program interface. The programming for the device specific interfaces interacts with the programming for the central processing unit to enable a device connected to each device specific interface to communicate through the system. The programming for these interfaces implements the predetermined application program interface for interaction with device specific higher level functions of a respective interface.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

FIG. 3 depicts a protocol or logic stack for the device interfaces.

FIG. 4 is a block diagram of a specific device interface for providing IP communications for a standard telephone device via the in-home network.

DETAILED DESCRIPTION OF THE PREFERRED EMBODIMENTS

The present invention utilizes a gateway providing an open software interface to control in-home communications and to enable in-home devices of various divergent technologies to selectively access external communication features through two or more wide area networks. The in-home network may utilize more than one media in the home. The use of an open interface enables many different types of devices to communicate, and when desired to access external communication resources, through the in-home network media and the centralized gateway functionality.

Figure 1:
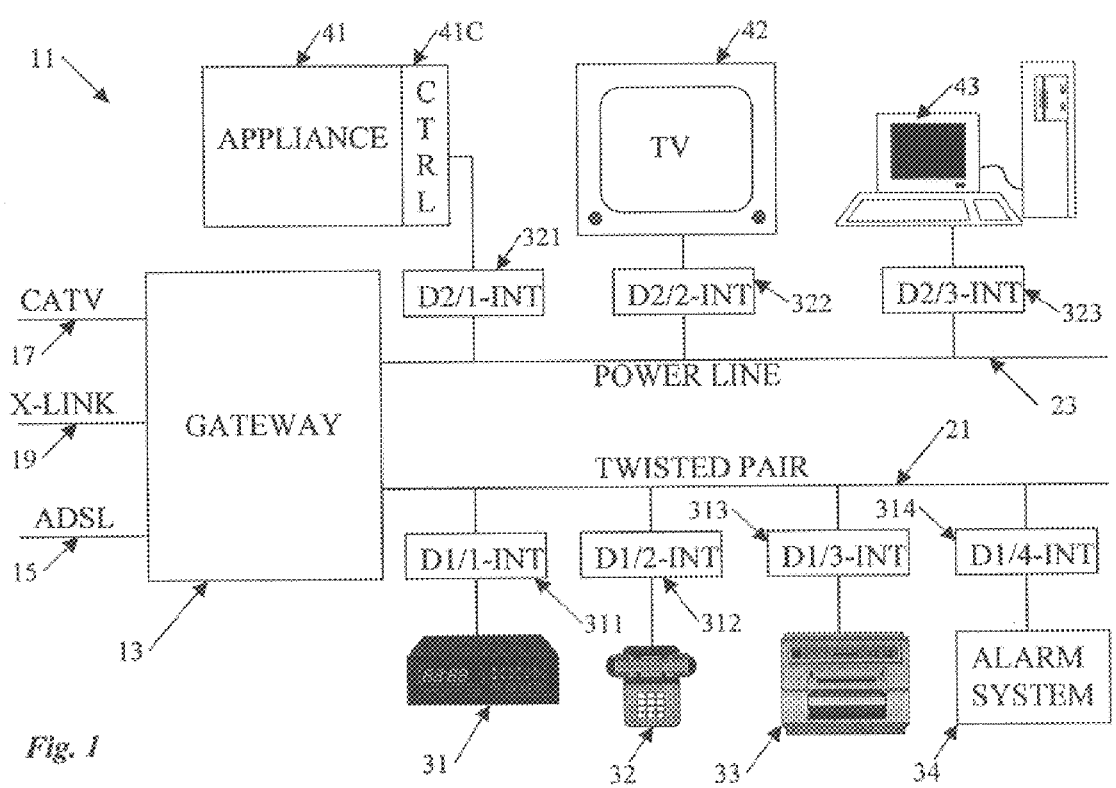
FIG. 1 is a high-level block diagram of a multi-service home network implemented in accord with the present invention.

FIG. 1 illustrates an example of an in-home network 11 embodying the concepts of the present invention. As shown, the network 11 includes a central node identified as a gateway 13. This node provides interfaces between internal and external communications media, controls access between internal and external communications and controls certain specialized features or applications available on the network.

For external communications, the gateway 13 connects to and provides appropriate interfaces to two or more external communication networks through lines or links 15–19. The lines or other links 15, 17 and 19 provide wide area network connections to one or more public data communication networks. Preferably, the links connect to separate public networks, however, the links could provide different types of service connections to facilities operated by one carrier. For example, one line might provide a T1 service, another line an ADSL service and a third line an ISDN service. A single carrier may provide all of these services to the premises, or the user may elect to subscribe to the different services through two or more local exchange carriers.

In the illustrated example, the gateway 13 connects to a first external communication network link shown as a digital subscriber line (DSL) 13. A DSL type line is a communication service provided by a local exchange carrier over a telephone line, typically twisted pair wiring to the customer premises. A number of DSL services are available from telephone companies today, for example integrated services digital networks (ISDN) utilize a 2BQ coding technique to offer 144 kb/s digital services over twisted pair wiring. This bit rate may be sub-divided into two bearer (B) channels for separate voice or data communications and a data (D) channel for signaling. Additional DSL technologies are being developed and are in early stages of deployment, for providing substantially higher rates of data communication over twisted pair telephone wiring of the telephone network. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For digital data communication purposes, an ADSL modem implemented in a telephone line interface card within the gateway 13 communicates with a matching modem provided in the telephone network of the local exchange carrier. These modems create at least two logical channels in the frequency spectrum above that used for the normal telephone traffic. One of these channels is a medium speed duplex channel; the other is a high-speed downstream only channel. The data communication over the ADSL line 15 typically provides access to the public data network, now commonly referred to as the Internet, for example as shown in U.S. Pat. No. 5,790,548 to Sistanizadeh et al. As discussed more later, the high-speed access to the Internet through the gateway 13 and the ADSL line 15 enables a variety of different types of communications to and from the devices within the customer premises.

The gateway 13 also provides digital communications access to other public networks. For example, the gateway 13 may also connect to a coaxial cable 17 from a CATV system. The CATV system may be an analog CATV system with cable-modem service for high-speed data communication. In such an implementation, the cable-modem service typically provides an alternate access to the Internet. In more advanced systems, the CATV cable link 17 may connect to a hybrid fiber-coax network providing increased broadband digital services, for example as disclosed in U.S. Pat. No. 5,847,751 to Safadi. Such advanced CATV networks may offer digital broadcast and interactive video communications as well as Internet access.

The drawing also shows an "X-Link" to the gateway 13. This is a generic representation for other digital communication lines or links to the gateway. The gateway 13 may provide connections to one or more digital links to/from other public networks, for example using wireless communications or direct optical fiber links. Alternatively, the gateway 13 may connect to a private network, such as a corporate LAN. All such networks accessed through the links 15–19 provide "wide area" data communications, that is to say over areas larger than that served by the network 11.

The gateway 13 provides a routing functionality between the wide area links and the interfaces to one or more internal media, shown for example at 21 and 23. The interfacing between the links and the routing function effectively provide all devices coupled to the internal media to communicate via any of the external networks.

The network 11 provides multiple options for connections to wide area networks, looking outward from the premises. Any one device within the premises may use different ones of the outside networks, even though those networks utilize different technologies for communication to and from the home. For example, one device may obtain broadband service through the ADSL line 15 one time, and at another time, the same device might obtain broadband service through cable-modem service on the CATV link 17. Multiple sessions from multiple devices may be going on at the same time, in some cases over the same broadband link, but often over different broadband links. There also may be applications that require one in-home device to simultaneously access external communication services over two or more of the external links. The gateway 13 controls the selection of the external links for each session, based on its internal programming. The selection often is automatic, e.g. on a best available basis for each application. In some cases, the device user may select the external link(s) for a particular communication.

Within the premises, the gateway 13 connects to one or more internal digital media 21,23. The internal media may be wireless or utilize special wiring installed for the home network. Preferably, the network 11 utilizes one or both of the existing wiring systems provided for power and telephone service.

In the illustrated embodiment, the gateway 13 connects to two separate in-home media, each of which uses existing wiring in the home. One media 21 may provide digital communications over twisted pair telephone wiring in the home. The other illustrated media 23 provides digital carrier communications over the existing AC power line circuitry within the premises. The illustrated gateway 13 includes appropriate interface cards to enable connection to and two-way digital communication over the telephone wiring 21 and over the power line 23.

There are actually more technical difficulties with communications over the power line 23, making the interfaces for communication via such media more complex and expensive However, there are power outlets for connections all over the premises. In contrast, the telephone wiring communication is easier to implement technically, but there are fewer outlets for connections to the line 21, and as a result, many devices in the home are not located for easy access to a telephone line jack.

In accord with the invention, a wide variety of devices commonly found in the home or office can connect to and communicate over the media 21, 23 and thus utilize the communication services available on or through the network 11. For example, the drawing shows an audio system component 31, a telephone 32, a printer 33 and a home alarm system 34. In the example, these first four devices connect through interfaces to the twisted pair telephone wiring 21.

An appropriate control device 41C controls appliances, such as 41. The control device 41C may send appliance status information or alarms and/or receive control command codes via the network 11. Video devices, such as the TV 42 and/or a VCR (not shown) also send and/or receive digital signals via the network 11. It is also envisioned that the user will have one or more personal computers (PCs) 43 coupled to the network. The PC preferably provides a user interface to allow monitoring and control of other devices on the network 11 and provides a terminal for the user interface to the gateway 13. Devices such as appliance control 41C, TV 42 and PC 43 may connect to the first media 21, or as shown, they may connect to a second available media, such as the power line 23.

In accord with the invention, each device connects to one of the physical in-home media 21 or 23 through a device interface D. Looking toward the network side, each such device interface provides a physical connection to the network media 21 or 23 and two-way digital communication over the media, in accord with the standard protocol utilized on that media. For example, the D1 interfaces 311, 312, 313, 314 implement an HPNA (Home Phoneline Network Alliance) standard interface protocol for digital communication over the twisted wire pair 21. The D2 interfaces 321, 322, 323 implement one of the available protocols for carrier communication over the power line 23.

Each device interface also implements a standard, open application program interface (API), for communications with the gateway 13. Essentially, the API implements a predetermined set of communication functions and messages, for use in communications over the media with the gateway 13. The API also implements a standard set of function calls and response messages, for interfacing through a higher level application and appropriate hardware to a connected device.

To the actual user device, each device interface D implements a physical/electrical interface for the particular device. Consider the D1/2 interface 312 for the telephone 32, as an example. If the telephone 32 is a standard analog telephone, the interface 312 emulates an analog type plain old telephone service (POTS) type line appearance to the telephone 32. The interface sends and receives tone signals and analog speech communications. However, the D1/2 interface 312 also provides the necessary conversions between digital and analog and sends and receives data messages over the media 21 relating to the standard telephone line signaling used by the POTS telephone 32. In accord with one aspect of the invention, this processing also entails digital compression decompression, packet assembly/disassembly and appropriate signaling to enable Internet Protocol (IP) transport of the telephone communication signals, for example through the gateway 13 and one of the high-speed links to the public Internet. The interface 312 also preferably provides a normal analog interface between the line 21 and the telephone device 32 and the logic to select between analog and digital communications. Although shown as a telephone, those skilled in the art will recognize that the device or station 32 may be any device compatible with plain old telephone service (POTS) operation, such as an answering machine, an analog telephone line modem, a facsimile machine, or any of the known wire-connected or cordless telephones.

The other device interfaces would similarly implement appropriate interfaces for the respective devices. The D2/3 and D1/3 interfaces (323, 313) would implement one or more digital port type interfaces, standardized for PCs and computer peripheral devices. The interface 313 for example, would typically implement a standard parallel printer port interface. The device interfaces 311 and 322 would implement interfaces that have been standardized for audio and/or video entertainment system components. The D2/1 interface 321 would implement a physical interface similar to that provided within X-10 compatible control devices communicating over power lines. The device 314 would implement an interface appropriate to the particular home alarm system 34.

Many of the existing in-home systems alone would not support the infrastructure for multiple broadband communications with wide area networks. Even computer communications typically supports only one type of wide area access technology, which often is dedicated to the computer communications. However, the network 11 provides communication services to virtually any and all electrical or electronic devices within the premises. Consequently, the different devices can effectively share the resources. From the user's perspective, the cost of the external communication services and the infrastructure are spread over all of the user's in-home activities, including audio and video entertainment, data processing, alarm/remote control, and voice telephone service.

Physically, the gateway 11 may take a number of different forms. One version of the gateway 13 mounts between the studs, like a breaker box, in a new home. Another version is a small box that stands on the floor and plugs into the power and phone lines at any convenient location within the premises. The functional elements within the gateway, however, would be essentially similar except for the particular set of internal and external interfaces chosen for each user's installation.

Figure 2:
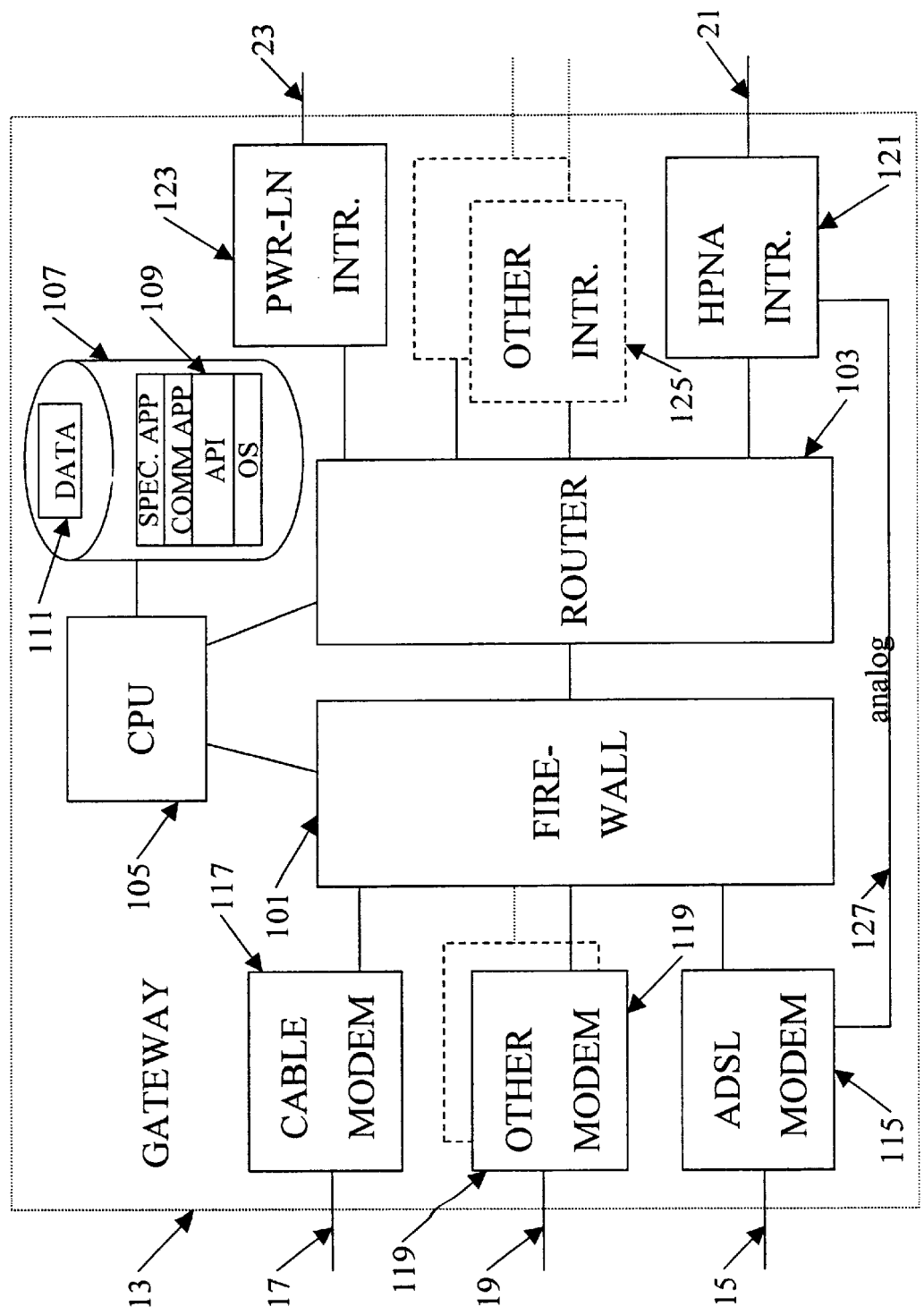
FIG. 2 is a functional block diagram of the central node or "gateway" of the network of FIG. 1.

FIG. 2 provides a block diagram illustration of the major functional elements of the gateway 13. The gateway 13 includes a firewall 101 and a router 103. The gateway also includes a programmable central processing unit (CPU) 105 with an associated hard disk drive 107 or the like for storage of programming 109 and data 111. The CPU 105 provides overall control of all operations of the gateway 105.

The programming 109 for the CPU 105 implements an operating system (OS), API software logically complimenting an application program interface implemented in the device specific interfaces D and an application for controlling the communication functions through the network 11. The gateway will also execute specific applications for certain services, such as IP-Telephony through the Internet, web access, etc. The CPU may also execute certain specialized application programs, to provide enhanced features, such as an arbitrage service for least cost routing of IP-Telephony services. The software of the gateway 13 is modular and easily upgraded by replacing or adding upper level application modules. The gateway software also sets priorities for different types of communications. For example, the gateway may assign higher priority to real-time communications, such as IP-telephone service. Software downloads, for example of news items on selected topics, would have a lower priority.

The firewall 101 limits the exposure of the gateway 13 and the internal equipment to an attack coming in from any of the external wide area networks. The firewall 101 preferably provides network level protection by examining traffic at the network protocol level, typically by filtering packets. Preferably, the firewall 101 also provides application level protection. For example, the firewall 101 preferably scans all incoming messages for viruses and blocks any contaminated packets. As part of the application level protection, the firewall might also readdress out-going packets so that the packets appear to originate from a single address associated with the firewall 101.

The gateway software and the firewall 101 also may implement restrictions on services provided for various in-home devices. For example, certain telephones may not be able to make chargeable long distance calls. Certain persons or devices on the premises may not be able to access certain pages or types of pages on the World Wide Web.

The router 103 may be a packet switch controlled by the CPU 105 and associated programming, although other types of routing devices may be used to facilitate the flow of digital messages throughout the system. Assuming the router 103 is a packet switch, any of a variety of known packet switch structures may be used, for example conforming to TCP/IP protocol, conforming to one of the Ethernet protocols, etc. The firewall 101 may be a physically separate hardware device, with associated control programming run by the CPU 105, or the firewall 101 may be implemented entirely in software for controlling operations of the router 103.

The gateway 13 includes the interface cards necessary for connection to the various internal and external communication links. For this purpose, the gateway 13 includes a number of internal media interfaces, shown for example as interfaces 121, 123 and 125. The gateway 13 also includes two or more external network interfaces shown for example as interfaces 115, 117 and 119. Within the gateway all of these interfaces interconnect and communicate with the firewall and router, using the appropriate router protocol, e.g., TCP, IP or Ethernet, etc.

The network 11 preferably connects to at least two outside networks, and at least one of those networks provides a relatively broadband grade of digital communication service. The user will subscribe to services of the two or more external networks. For the external communications, the gateway router 101 and firewall 101 connect to two or more interface cards coupled to the lines or links to the external networks, to which the user subscribes. The external network interface cards are plug-in cards that are easily selected and swapped in and out of the housing of the gateway. In this manner, the manufacturer can supply the number and type of cards chosen for each installation to match the user's wide area network subscriptions. In each case, however, the gateway 13 would include wide area network interface cards for at least two different external network connections. The user could add and/or remove external network interface cards as the user changes external network service subscriptions.

For example, for the DSL link 15, the gateway 13 would include an appropriate DSL interface card such as the ADSL modem 115 shown in FIG. 2. For the CATV link 17, the gateway 13 might include a cable modem 117 or an appropriate digital video network interface if the external CATV network is an advanced hybrid fiber-coax network. If the user elects further subscriptions, for example through one or more additional links 19, the firewall would also connect to the appropriate other modems 119. The firewall implements security procedures for communications to and from the external links 15, 17, and 19 and may implement access restrictions on outgoing services utilizing those links.

The network 11 preferably can support any analog services provided by the external networks. For example, the ADSL modem 115 and the HPNA interface 121 would provide baseband analog service through the interconnection 127, from the line 15 over the wire 21 directly to a standard telephone 32, e.g. for local and emergency calls. If the CATV link 17 provides standard RF broadcast service together with the cable modem service, the cable modem 117 could provide an analog link for the broadcast channels to an RF port of the TV 42 or other video devices not shown.

The gateway also includes one or more interface cards for connection to and communication via the internal media. In the example shown in the drawings, the router connects through the HPNA compatible interface card 121 to the twisted pair telephone wiring 21. The router also connects through a power line data communication interface 123 to the in-home power line 23. If the user has additional media, such as a wireless local data link or an Ethernet LAN, the gateway 13 would include other interface card(s) 125 matching the additional in-home media. The internal media interfaces provide physical and electrical connections to the media, and each interface provides two-way conversions between the protocol used on the respective meter and the protocol of the router. The router 103 provides packet-switched routing to and from the various interfaces 121, 123 and 125, to enable communication between the various devices within by the premises. The router also provides packet-switched routing for the various interfaces 121, 123 and 125 to and from external interfaces 115, 117 and 119 through the firewall 101.

The router 103 also routes packet between the CPU 105 and the various interfaces, to allow the CPU to communicate with the internal devices, and if necessary to communicate through the wide area networks.

The CPU 105 implements an operating system and a communication application that control the necessary functions of the router 103 and the firewall 101 to prioritize and route various communications between the internal devices and between the devices and the external communication facilities. The gateway software also implements functions matching the common API implemented by the device specific interfaces. The operating system and communication application are designed to automatically detect a new device and interface when connected to the network 11 and to interact with such a new device interface to configure the gateway and the new interface to enable communications through the system 11. From the user's perspective, if the user plugs in a new device specific interface and associated device into the power line 23 or into the in-home telephone wiring 21, the network 11 executes the necessary configuration routines and automatically enables communications for the new device.

Assuming adequate security, the operations of the gateway 13 are configurable from any data device in communication with the network 11. For example, the user may set certain options and/or personal preferences from any data device or PC coupled to the in-home media 21, 23. The user also may obtain software, for upgrades or addition of modules for new features, from a server accessible through one or both of the wide area network connections. The remote server communications would also provide help functions and gateway diagnostics.

The user might open a browser on the PC 43 and access a series of web pages to configure the system 11, to obtain help, to perform diagnostics or to obtain software downloads to the PC or the gateway or the device interfaces. The web pages may be in one of the data devices within the in-home network, but many of the pages and associated software modules would reside in a server accessed through one of the public wide area networks. Alternatively, the configuration, diagnostics and software downloads could be entirely automatic, even those including communications with an external server via the Internet.

FIG. 3 shows the logical hierarchy of functions of any one of the device specific interfaces. At the lowest level, the device-specific interface provides a physical (PHY) interface 44 to the particular in-home network media. For example, this function entails actually sending and receiving electrical signals over the media. The next function entails media access control (MAC) 44. This function will vary depending on the protocol utilized on the particular media. In general, the MAC function 44 determines when the particular device gains access to the media, for sending or receiving digital information over the media. For example, in a protocol wherein each device on a local network media 21 or 23 has an address, the MAC controls the address related functions, such as sending address signals and recognizing address signals in received data signals. The MAC control functionality together with the actual physical network interface 44 provide a physical media interface, for example to the in-home telephone line 21, to the in-home power line 23 or to any other in-home media utilized in the particular installation. For the twisted pair telephone line interface, these elements might take the form of a standard chip set built to the HPNA standard, such as a chipset available from Epigram of Sunnyvale, Calif., e.g. for providing 10 Mb/s digital communications over the in-home telephone line 21.

The next higher layer 46 implements an operating system (OS) for the device interface and an application program interface (API). The OS provides all of the communication functions through the physical interface and the in-home network to enable communications with and through the gateway 13. For example, the OS would interact with the operating system and communication application software in the gateway 13, to set up a communication session via one of the external network interfaces. The API provides function calls and response messages to enable the OS to interface with higher layer application programs 47, that are specific to the particular device connected to the interface and any special functions enabled through the device interface. In accord with the invention, the network 11 utilizes an API that is common for all devices and all higher level applications.

The device interface also implements a physical interface 48 to the particular device intended for connection thereto. From the network perspective, the physical interface 48 to the connected device may be considered as the highest level element associated with the application programming 47 of the interface.

The device specific application is designed to conform to the common API used by the in-home network 11. The device-specific application 47 includes the instructions necessary to power-up, detect a connected device and interact with the connected device, as well as communicate through the API 46 with the gateway 13 to self-configure for network communications and to perform the actual routing functions through the OS and the API 46. The device-specific application 47 controls the physical interface 48 to conform to the physical signaling protocols utilized by the connected device. For example, if the interface will connect to an analog telephone, the application 47 controls the interface 48 to emulate POTS telephone line signaling. If the connected device is an ISDN telephone, the application 47 controls the interface 48 to emulate an ISDN telephone line. If the device is a television, the interface 48 and application 47 provide appropriately formatted video signals.

An interface for a data device, such as the interface 323 for the PC 43, preferably takes the form of a LAN card. The card provides the physical interface to a particular type of port or bus in the PC 43 or other data device 33 and provides the physical interface to the particular type of in-home LAN media, in the illustrated example to the power line 23, or to the twisted pair 21 or other in-home media. The LAN card type interface 323 would also provide the protocol conversion between the protocols used within the PC or peripheral and on the in-home network 11 and would implement the application software to convert between the message set of the API and the message set utilized by the PC 43.

The use of the open API type interface facilitates addition of new types of devices for communication via the network 11. A designer need only buy or build the appropriate physical layer elements for the interface and the API software, and then the designer can design new software for the particular new device intended for connection to the network 11. If the new device-specific application conforms to the API, the designer can select any software for that application. For example, different designers can select different application function sets even for the same type of device, in order to individualize their products. In a specific example, one IP telephone vendor might design an IP-telephone interface application to provide a very basic (cheap) dial-in and dial-out Internet telephone service. Another IP telephone vendor might design an IP-telephone interface application to provide a high-end telephone service with many additional features, such as call waiting, call transfer, etc.

The vendor of the network 11 may supply the gateway and all of the device specific interfaces. However, because of the use of the open API, the vendor may prefer to allow other equipment vendors to develop their own device specific interfaces. The vendor of the system 11 only needs to specify the physical media and associated protocols and provide other vendors with open access to the executable code needed to implement the API.

The API and the matching software in the gateway 13 also provide a level of protection against problems with new devices or device interfaces. The device-specific application provided by the vendor does not directly communicate with the gateway 13 or other device interfaces on the network 11. If there are problems with the device-specific application, the new interface may not work properly, but it will not disrupt service to any of the other devices on the network.

To understand the structure and functionality of the device interfaces it may be helpful to consider an example in somewhat more detail. For that purpose, FIG. 4 shows a functional block diagram of the elements of the device specific interface 312 for providing digital communications for the analog telephone 32.

As shown, the telephone 32 connects through a telephone cable with an RJ-11 plug 51 into an RJ-11 jack 53, in the interface 312. The device interface 312 includes an analog interface 55 and a microprocessor ($\mu$P) based controller 59 with associated program and data memory 60. The analog interface 55 presents a two-wire telephone appearance through the RJ11 connectors 51, 53 to the telephone 32. The analog interface 55 switches between an analog mode and a digital mode. In the analog mode, the interface simply passes signals between the telephone 32 and an analog link 56. In the digital mode, however, the interface 55 emulates a POTS type analog telephone loop from an end office type telephone switching system. Circuitry of the interface 55 provides line voltage and current ('battery feed'), off-hook detection, DTMF tone detection, ring-trip, ringing signal generation, etc., over the two-wire connection to the telephone 32. The $\mu$P controller 59 controls all operations of the device interface 312, including operations of the analog interface 55, for example to initiate digital communication in response to detection of certain signals from the telephone 32, generating signals to ring the telephone 32, in response to an incoming digital call etc.

As noted earlier, the twisted pair 21 supports analog POTS service to the telephone 32, as well as the digital communication services, for example utilizing a multiplexing/splitting technique through the ADSL modem 115. The telephone interface 312 includes an HPNA interface 63 or the like for connection to the twisted pair telephone wiring 21. Like the ADSL modem, the HPNA interface provides two-way digital communication as well as baseband analog telephone communication. The analog interface 55 normally passes the baseband analog telephone signals over the link 56 and through the HPNA interface 63, to provide POTS service access to the line 21 for the telephone 32. Upon detection of a predetermined dialed digit or code, for example the dialing of a "9," the $\mu$P controller 59 would activate the digital functions of the interface 312 and disconnect the link 58. Similarly, the $\mu$P controller 59 would activate the digital functions and disconnect the link 56 in response to an incoming digital call.

During digital operations, the analog interface 55 converts between two-wire analog signals used by the telephone 32 and four wire send and receive signals. The analog interface 55 supplies analog voice signals for upstream transmission to an input of a coder/decoder circuit (CODEC) 57. The analog interface 55 also receives analog voice signals from the CODEC 57. The CODEC 57 performs two-way conversions between analog and digital signal format. Preferably, the CODEC also compresses and decompresses the digital format signals, to enable digital transport of voice signals at bit lower rates.

The CODEC 57 exchanges digitized and compressed voice signals with a packet assemble/disassembler (PAD) 61. In the upstream direction, the PAD 61 separates the bit stream of compressed digital voice signals into segments and wraps each segment into an addressed packet, for example in TCP/IP form. In the downstream direction, the PAD 61 processes received packets, extracts the data and reassembles the data into a bit stream, in this case a bit stream of digitized and compressed voice signals for decoding in the CODEC 57.

The PAD 61 in turn sends packets to and receives packets from the HPNA interface 63. Although other physical media interfaces could be used, in the example, it was assumed that the telephone 32 communicated via the twisted pair media 21. For purposes of discussion, it is assumed that communication via twisted pair 21 conforms to the HPNA standard, although other forms or communication or other media may be used. The interface 63 provides the physical conversions necessary to communicate the packet data to and from the PAD 61 via the twisted pair media, to communicate with the gateway 13 and other devices coupled to the media 21.

Logically, the HPNA interface 63 implements the physical network interface 44 and the MAC function 45. The $\mu$P controller 59 implements the operating system (OS) and the application program interface (API) at level 46. The special programming for the $\mu$P controller 59 also implements the device-specific application 47, in this case the application for TCP/IP communication (using PAD 61) and for interaction with a POTS telephone 32. The $\mu$P controller 59 controls the analog interface 55 to provide the actual physical interface 48 to the telephone 32.

The network 11, through the interface 312 provides IP transport for voice signals to and from the analog telephone 32. The CPU 105 in the gateway 13 implements a software interaction through the API as well as any related special service functions, to enable. communication from the devices using any of the available external communication networks. For the IP/Telephony service for example, the gateway 13 provides digital communications to and from the Internet, via either the DSL line 15 or the cable modem service over the CATV link 17. The gateway may also implement related special service functions, such as an arbitrage function to select the least cost option(s) for any telephone calls that might incur charges for the user.

At least a portion of the programming for the interface 312, stored in the memory 60, is dynamically rewriteable. This allows downloading of software for storage in the memory 60, to modify the OS, the API or more often the device specific application 47. The software download arrives through the in-home network media 21 or 23, but the source of the software may be virtually anywhere. The gateway 13 may provide the new software, to insure that all or a portion of the OS or the API corresponds to the current software utilized in the particular gateway. The user may load new software for the gateway and one or more of the device interfaces through the PC 43 or some other data device on the in-home network 11. Alternatively, a device interface such as the interface 312 may receive software patches and/or upgrades from external sources, such as a server on the Internet.

As shown by the above discussion, software utilized by various components of the network 11 may be stored in various memory devices and carried on various signals communicated through the internal network as well as one or more of the external networks. Those skilled in the art will recognize that such software may be transported to and loaded from virtually any computer readable medium into the relevant components of the network 11. The term computer-readable medium is intended to cover any physical element for storing executable software code and/or associated data as well as any electrical signal or electromagnetic wave for transporting the code and/or data through a network or over the air.

The home network 11 enables a wide range of communication services, for virtually all electrical devices within the premises. For example, for audio equipment, the gateway 13 provides digital access to the Internet for selection of audio programming from the audio system 31 and communication of selected audio from the Internet to the audio system 31. The interface 311 accepts standard signals from the system 31 and provides appropriate outputs based on the digital information from the Internet. A user might surf the web to select an audio broadcast service and listen to the broadcast audio from the Internet through the home audio system 31, essentially to obtain an "Internet Radio" service. Similar communications between the TV and the Internet might enable viewing of selected programming on demand or Internet television broadcasts.

The gateway 13 and the communications with the controller 41C enable monitoring and control of virtually any home appliance. The user might check the status of a microwave oven from the PC 43, and enter further operational commands if desired. Alternatively, the controller 41C can send alarm reports through the gateway 13 and the Internet to any desired external location, for example to inform a user at her office of a problem with the air conditioning, or the user might send control information from a remote location to adjust the air conditioning temperature setting.

The home network 11 may also support alarm related communications and control functions for the home alarm system 34. If the user has such an alarm system, the network 11 allows the user to program the alarm system 34 from the PC 43. The network also enables remote reporting via the Internet, as an alternative to the normal telephone line communication, for example to simultaneously report to an alarm monitoring company and to a user who is away from home.

The expandability inherent in the present invention enables addition of virtually any existing device in the home to the network 11. Also, manufacturers can build and/or program a myriad of devices for use with the network 11. For example, a disk drive manufacturer might build a large drive/server with an interface, to enable PCs 43 in the home to share the high-capacity storage. With an appropriate data interface card, a user might connect a computer with disk storage to the network 11 to implement a mail service, providing E-mail, FAX-mail, voice mail and the like, for example as a service to third parties or as a mail system for a small business particularly where the employees telecommute. As another example, a small bar-code scanner might be adapted to utilize the network 11, for example, to allow the user to scan each item used in the house to compile a list of grocery items for subsequent purchase. Personal digital assistants can communicate via the network, for example to receive calendar updates. New home appliances are being built with processors, displays and keypads to enable programmable functions. Such devices may be easily adapted for access and control via the network 11. A number of software applications currently requiring a full PC, could be implemented on simple portable data devices which communicate with the PC 43 and/or over external networks via the in-home network 11.

For convenience, the above description has referred to in-home networks and existing wiring in the home. Those killed in the art will recognize that the invention also applies to networking in other types of premises. For example, the network may be used in a small business, particularly where the size and needs of the business do not justify the expense of deploying a commercial-grade local area network or the business requires communication for a wider range of on-premises equipment. As another example, the network may be utilized in a multi-unit dwelling to provide advanced communication services and unified networking to individuals in a number of closely located residences within a larger premises such as a housing development, an office or apartment complex, or a college or research campus.

Also, for ease of understanding, the device interfaces 311–323 were shown as separate from the particular devices. Equipment vendors may elect to incorporate the interfaces directly into new devices.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for providing unified digital communications for diverse devices within a premises and access to external wide area communication facilities, the system comprising:
   an internal communication media within the premises;
   a plurality of different device specific interfaces, each different device specific interface comprising a physical media interface compatible with the media and coupled thereto, a common application program interface for controlling communication through the physical media interface, a physical device interface for coupling to a predetermined different type of device within the premises, and a device specific application compatible with the common application program interface for controlling functions through and responding to inputs from the physical device interface; and
   a gateway, the gateway comprising:
   (a) an internal interface coupled to and compatible with the internal communication media,
   (b) a plurality of external network interfaces, each external network interface providing a digital communication connection for a different type of wide area network link to one or more public networks, at least one of the external network interfaces providing a broadband digital communication connection for a respective wide area network link;
   (c) a router coupled between the internal interface and the external interfaces for selectively routing digital information to and from the interfaces,
   (d) a program controlled central processing unit for controlling the routing of digital information to and from the interfaces through the router, to facilitate inter-device communication within the system and to provide selective communications via the external network interfaces, and (e) a software program executable by the central processing unit to perform the routing control, said software program being compatible with the control of communication by the application program interface that is common to the different device specific interfaces.

2. A system as in claim 1, wherein another one of the external network interfaces provides a broadband digital communication connection for another respective wide area network link.

3. A system as in claim 2, wherein:

the one external network interface comprises a digital subscriber line modem, for providing a broadband communication connection for a line from the premises to a telephone network; and said another one of the external network interfaces provides broadband digital communication for a cable link from the premises to a CATV network.

4. A system as in claim 3, wherein:

the digital subscriber line modem comprises an asymmetrical digital subscriber line modem; and said another one of the external network interfaces comprises a cable modem.

5. A system as in claim 1, wherein the internal communication media comprises at least one media selected from the group consisting of: telephone wiring, power line wiring, a customer premises wireless link, and a local area network media.

6. A system as in claim 1, further comprising:

a second internal communication media within the premises; and at least one additional device specific interface, comprising a second physical media interface coupled to and compatible with the second internal communication media, a program interface conforming to the common application program interface for controlling communication through the second physical media interface, a physical device interface for coupling to a predetermined type of device within the premises, and a device specific application compatible with the common application program interface for controlling functions through the second physical device interface, wherein the gateway further comprises a second internal interface, coupled to and compatible with the second internal communication media, and coupled to the router.

7. A system as in claim 6, wherein:

one of the internal communication media within the premises comprises telephone wiring; and another one of the internal communication media within the premises comprises power line wiring.

8. A system as in claim 1, wherein at least one of the device specific interfaces is adapted for interfacing with a plain old telephone service device.

9. A system as in claim 1, wherein at least one of the device specific interfaces is adapted for interfacing with a data processing device.

10. A system as in claim 1, wherein at least one of the device specific interfaces is adapted for interfacing with an appliance controller.

11. A system as in claim 1, wherein at least one of the device specific interfaces is adapted for interfacing with an audio or video entertainment component.

12. A system as in claim 1, wherein at least one of the device specific interfaces is adapted for interfacing with an alarm system on the premises.

13. A system as in claim 1, wherein the gateway further comprises a firewall in communication with the external network interfaces and the router, for providing security on communications via the wide area network links.

14. A gateway for providing communications internal to a premises, and providing access to multiple external communication networks, the gateway comprising:

an internal interface for coupling to and compatible with an internal communication media within the premises;

a plurality of external network interfaces, each external network interface providing a digital communication connection for a different type of wide area network link, at least one of the external network interfaces providing a broadband digital communication connection for a respective wide area network link;

a router coupled between the internal interface and the external interfaces for selectively routing digital information to and from the interfaces;

a program controlled central processing unit for controlling the routing of digital information to and from the interfaces through the router, to enable digital communication between devices coupled to the internal communication media and to enable selective communications of the devices via the external network interfaces; and a software program executable by the central processing unit to perform the routing control, said software program being compatible with a common application program interface implemented by interfaces for providing the coupling of the devices to the internal communication media.

15. A gateway as in claim 14, further comprising a firewall in communication with the external network interfaces and the router, for providing security on communications via the wide area network links.

16. A gateway as in claim 14, wherein the internal interface comprises an interface selected from the group consisting of: a power line data communication interface, a telephone line data communication interface, a local wireless data communication interface and a local area network interface.

17. A gateway as in claim 14, further comprising a memory, within the gateway and coupled to the central processing unit, for storing the software program.

18. A gateway as in claim 17, wherein the central processing unit and memory capable of receiving a new version of the software program via one of the interfaces and storing the new version of the software program in place of an old version of the software program.

19. A gateway as in claim 14, wherein the central processing unit is adapted to receive and process configuration instructions communicated to the gateway via at least one of the interfaces.

20. A gateway as in claim 14, wherein two or more of the external network interfaces are selected from the group consisting of: a digital subscriber line modem, a cable modem, and a wireless public data network modem.

21. A gateway as in claim 14, wherein:

one of the external network interfaces comprises an asymmetrical digital subscriber line modem; and another one of the external network interfaces comprises a cable modem.

22. A program product for use in a system for providing data communications within a premises and data communications access to a plurality of wide area network links, the program product comprising:

first executable code, machine readable from a medium, the first executable code comprising programming for a central processing unit of a gateway coupled between the wide area network links and a data communication media within the premises, wherein the programming for the central processing unit controlling the data communications within the premises and the data communications access to the wide area network links, and the programming for the central processing unit implements the control functions in a manner compatible with a predetermined application program interface; and second executable code, machine readable from one or more media, the second executable code comprising programming for each of a plurality of device specific interfaces, for interaction with the programming for the central processing unit to enable a device connected to each device specific interface to communicate through the system, the programming for each of the device specific interfaces implementing the predetermined application program interface for interaction with device specific higher level functions of a respective interface.

23. A program product for use in a system for providing data communications within a premises and data communications access to a plurality of wide area network links, wherein a gateway of the system is coupled between the wide area network links and a data communication media within the premises for controlling the data communications within the premises and the data communications access to the wide area network links, and the programming for the gateway implements the communications control in a manner compatible with a predetermined application program interface, the program product comprising:
one or more machine readable media;
executable code on the one or more machine readable media, the executable code comprising:
programming for each of a plurality of device specific interfaces, for interaction with the gateway to enable a device connected to each device specific interface to communicate through the system, the programming for each of the device specific interfaces implementing the predetermined application program interface for interaction with device specific higher level functions of a respective interfacing to a respective one of a plurality of different types of devices.

24. A program product as in claim 23, wherein programming for at least one of the device specific interfaces further comprises a device specific application compatible with the common application program interface.

25. A program product for use in a system for providing data communications within a premises and data communications access to a plurality of wide area network links, wherein the system comprises a plurality of device specific interfaces adapted for coupling different types of devices for communication via a communications medium within the premises, and the device specific interfaces for different types of devices implement a common application program interface for interaction with device specific higher level functions, the program product comprising:
a machine readable medium;
executable code on the machine readable medium, the executable code comprising programming for a central processing unit of a gateway of the system coupled between the wide area network links and the communications medium within the premises,
wherein the programming for the central processing unit is for controlling data communications within the premises and data communications access to the wide area network links, and the programming implements the control in a manner compatible with the common application program interface.

* * * * *